United States Patent [19]

Schneider et al.

[11] Patent Number: 5,256,178
[45] Date of Patent: Oct. 26, 1993

[54] METHOD FOR PRODUCING AN OPTICAL FIBER OF HALIDE GLASS, PARTICULARLY AN INFRARED PERMEABLE FIBER OF HEAVY METAL FLUORIDE GLASS

[75] Inventors: Hartmut Schneider; Armin Staudt, both of Munich, Fed. Rep. of Germany

[73] Assignee: Siemens Aktiengesellschaft, Munich, Fed. Rep. of Germany

[21] Appl. No.: 15,901

[22] Filed: Feb. 10, 1993

Related U.S. Application Data

[60] Division of Ser. No. 823,610, Jan. 17, 1992, Pat. No. 5,201,930, which is a continuation of Ser. No. 594,664, Oct. 10, 1990, abandoned, which is a continuation of Ser. No. 335,686, Apr. 10, 1989, abandoned, which is a continuation of Ser. No. 122,448, Nov. 19, 1987, abandoned.

[30] Foreign Application Priority Data

Jan. 23, 1987 [DE] Fed. Rep. of Germany ....... 3701977

[51] Int. Cl.$^5$ ............................................. C03B 37/025
[52] U.S. Cl. .......................................... 65/3.11; 65/2; 65/13; 65/DIG. 16; 65/900
[58] Field of Search ............ 65/2, 3.11, 18.1, DIG. 16, 65/900; 501/37, 40, 904

[56] References Cited

U.S. PATENT DOCUMENTS 4,065,280 12/1977 Kao .
4,631,114 12/1986 Schneider .
4,741,752 5/1988 France .

FOREIGN PATENT DOCUMENTS

| 3514082 | 10/1986 | Fed. Rep. of Germany . |
| 54-102058 | 1/1978 | Japan . |
| 58-204832 | 11/1983 | Japan . |
| 59-3039 | 1/1984 | Japan . |
| 60-108349 | 6/1985 | Japan . |

OTHER PUBLICATIONS

D. C. Transmission Conference on Optical Fiber Communication, Atlanta 1986, reported in Technical Digest, pp. 20-21.
*Fluoride Glass Etching Method for Preparation of Infra-Red Fibres With Improved Tensile Strength,* Electronics Letters, Aug. 28, 1986, vol. 22, No. 18, pp. 949-950.

*Primary Examiner*—Robert L. Lindsay
*Attorney, Agent, or Firm*—Hill, Steadman & Simpson

[57] ABSTRACT

A method for manufacturing optical fibers from halide glass is provided. The method includes the steps of drawing a glass mass into a fiber in a dry gas atmosphere which contains a drying agent. In a further step of the process, an OH band which may still be present can be reduced by treating the fiber with a gaseous drying agent.

7 Claims, 2 Drawing Sheets

METHOD FOR PRODUCING AN OPTICAL FIBER OF HALIDE GLASS, PARTICULARLY AN INFRARED PERMEABLE FIBER OF HEAVY METAL FLUORIDE GLASS

CROSS REFERENCE TO RELATED APPLICATION

The present application is a divisional of U.S. Ser. No. 07/823,610 filed Jan. 17, 1992, which issued as U.S. Pat. No. 5,201,930 on Apr. 13, 1993 and was a continuation of U.S. Ser. No. 07/594,664, filed Oct. 10, 1990, which is now abandoned and was a continuation of U.S. Ser. No. 07/335,686, filed Apr. 10, 1989, which is now abandoned and was a continuation of U.S. Ser. No. 07/122,448, filed Nov. 19, 1987 and now abandoned.

BACKGROUND OF THE INVENTION

The present invention generally relates to a method for producing an optical fiber of halide glass. More specifically, the present invention relates to a method for producing an infrared transmissive fiber of heavy metal fluoride glass.

Optical fibers are utilized for the transmission of communications over a distance. It has been suggested that infrared transmissive optical fibers of heavy metal fluoride glass, for example, based on barium fluorozirconate ($BaF_2ZrS_4$) or beryllium fluoride may form the next generation of ultra-low-attenuation optical fibers for the transmission of communications over long distances. See, D.C. Transmission Conference on Optical Fiber Communication, Atlanta, 1986, reported in Technical Digest, pages 20-21.

Although there is a potential for heavy metal fluoride glass to form the next generation of infrared transmissive optical fibers, some of the properties of halide glass and requirements for optical fibers do not coincide. For example, the fiber must exhibit sufficient strength for practical applications as an optical fiber. However, this is opposed by the tendency of halide glasses manufactured from fluorides, chlorides, bromides, or iodides, to react at room temperature, or at least at fiber-drawing temperature, causing the absorption of hydroxyl groups from steam (water) and emission of gaseous hydrogen halide. This reaction has a deteriorating effect on the resultant strength of the fiber and likewise, can also increase the attenuation of the resultant optical fibers. These halide glasses are extremely reactive with water and even a nominally dry gas atmosphere is not sufficient for the production of fibers. Indeed, even an atmosphere having a water content of only approximately 1 to about 10 parts per million is not sufficiently dry for the production of halide glass fibers having an OH-free surface and, thus, good strength and not too thin.

Accordingly, there is a need for an improved method for producing optical fibers from halide glass, and specifically, an improved method for producing infrared transmissive fibers of heavy metal fluoride glasses.

SUMMARY OF THE INVENTION

The present invention provides a method for manufacturing optical fibers from halide glass. More specifically, the present invention provides a method for manufacturing infrared transmissive fibers of heavy metal fluoride glass. The method includes the step of drawing a glass mass into a fiber through an enclosure having a dry gas atmosphere. The dry gas atmosphere through which the glass mass is drawn into a fiber contains a drying agent that reacts with water and moisture in the atmosphere.

In an embodiment of the present invention, preferably, the drying agent, used to create the dry gas atmosphere, comprises at least one compound selected from the group consisting of: acid chlorides; acid fluorides; and acid anhydrides. Preferably, the acid chlorides are selected from the group consisting of: $SOCl_2$, $SO_2$, $Cl_2$, and $CF_3COCl$. Preferably, the acid fluorides are selected from the group consisting of: $SOF_2$, $SO_2F_2$, $COF_2$, and $CF_3COF$. In a preferred embodiment, the acid anhydride is trifluoroacetic acid anhydride.

In an embodiment of the present invention, the drying agent, used to create the dry gas atmosphere, comprises at least one compound chosen from the group consisting of: $BF_3$; $C_2F_6$; $C_3F_8$; hexafluoropropylene $C_3F_6$; octofluorocyclobutane $C_4F_8$; hexafluoroacetone $C_2F_6O$; $NF_3$; $ClF_3$; $BrF_2$; $JF_5$; $SF_4$; $SF_6$; and chlorofluorocarbons. In an embodiment of the present invention, preferably the chlorofluorocarbons are selected from the group consisting of: $CCl_2F_2$; $CClF_3$; and $C_2F_5Cl$.

Accordingly, the present invention provides a method for producing optical fibers from halide glass while at the same time suppressing the absorption of OH or water into the halide glass. The suppression of this absorption of water provides a fiber that does not suffer the deterious effects from such absorption, e.g., reduce strength and attenuation.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

Figure 1:
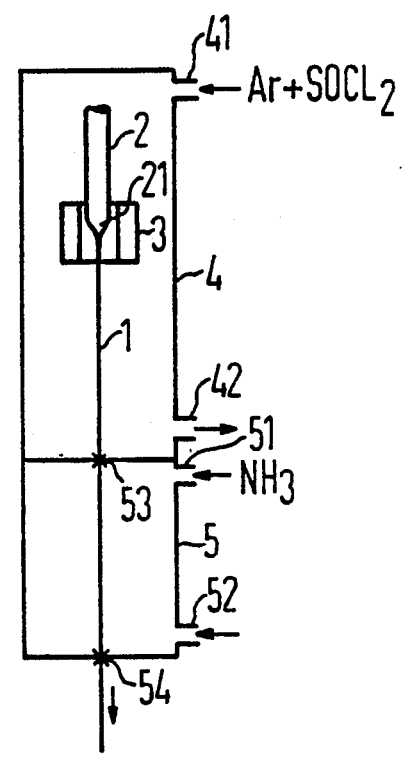
FIG. 1 illustrates a schematic perspective view of the apparatus of the present invention for drawing fiber in a dry gas atmosphere, containing a drying agent, of the present invention.

The present invention provides a method for producing optical fibers from halide glass. More specifically, the present invention provides a method for making infrared transmissive fibers from heavy metal fluoride glass.

As set forth above, in the background of the invention, one of the difficulties in making optical fibers from halide glass is the tendency of halide glass to absorb water. This absorption of water by the halide glass has a deteriorating effect on the strength of the resultant fiber and also increases the attenuation of the optical fiber.

The present invention provides a method wherein halide glass can be drawn into optical fibers while at the same time the absorption of water into the halide glass is suppressed. The present invention achieves the above-mentioned results by providing a dry atmosphere through which the halide glass is drawn into the optical fibers. The dry atmosphere is achieved by providing an enclosed atmosphere containing a drying agent. The drying agent chemically reacts with the moisture in the atmosphere to both chemically decompose the water or convert the water vapor present in the gas atmosphere into OH-free substances while at the same time chemically decomposing or converting hydroxyl groups present at the surface of the glass, down to a certain depth, so that OH groups are no longer present on the surface of the glass. The method includes the fiber drawing of the glass with the reactive drying of inorganic salts using a drying agent, such as acid chloride, to react with the moisture.

The drying agent for drying the atmosphere is preferably composed of a compound chosen from the group consisting of: acid chlorides; acid fluorides; or acid anhydrides. If acid chlorides are used as the drying agent, preferably the acid chlorides are selected from the group consisting of: $SOCl_2$; $SO_2$; $Cl_2$; and $CF_3COCl$. If acid fluorides are used as the drying agent, preferably the acid fluorides are chosen from the group consisting of: $SOF_2$; $SO_2F_2$; $COF_2$; or $CF_3COF$. It has been found that trifluoroacetic acid anhydride functions especially well as a drying agent if an acid anhydride is used as a drying agent in the present invention. This is because trifluoroacetic acid exhibits an especially good adhesion to a fiber envelope composed of perfluoroethylene propylene or, respectively, FEP.

In an embodiment of the method of the present invention, drying agents which, in contrast to the drying agents set forth above, do not react with moisture until temperatures greater than ambient temperatures, can be utilized to dry the atmosphere. Preferably, these drying agents include at least one substance selected from the group consisting of: $BF_3$; $C_2F_6$; $C_3F_8$; hexafluoropropylene $C_3F_6$; octofluorocyclobutane $C_4F_8$; hexafluoroacetone $C_2F_6O$; $NF_3$; $ClF_3$; $BrF_3$; $JF_5$; $SF_4$; $SF_6$; chlorofluorocarbons; or freons. If a chlorofluorocarbon is chosen as the drying agent, preferably the chlorofluorocarbon is selected from the group consisting of: $CCl_2F_2$; $CClF_3$; or $C_2F_5Cl$.

Preferably, the glass mass is pre-dried before the fiber drying step in the gas atmosphere having the drying agent.

Because the optical fiber is passed through an atmosphere wherein the drying agent is used to remove moisture, acid gasses that arise from the chemical reaction of the drying agent with the moisture may remain on the glass surface. Accordingly, it may be desirable to draw the resultant fibers through an acid neutralizing gas atmosphere after the fibers have been drawn through the dry gas atmosphere. Preferably, the acid gas neutralizing atmosphere contains $NH_3$.

Not only does the present invention provide a method for drawing the glass into optical fibers in a reduced moisture atmosphere, but the present invention also provides the possibility of removing water that has already been absorbed by the glass mass. By subsequent treatment of the drawn fiber with a drying agent, it is possible for the drying agent to react with moisture that has been absorbed into the glass mass removing this moisture so that the OH band at approximately 2.9 microns of the fiber can be reduced. In this regard, the fiber is preferably treated with $SOCl_2$ vapor.

Referring now to FIG. 1, a schematic perspective illustration of an apparatus for drawing fibers in a gas atmosphere that contains a drying agent for reacting with moisture is illustrated. As illustrated, a lower end 21 of a rod-shaped preform 2 of ZBLA glass is thermally softened in a furnace 3. The furnace 3 can be, for example, in the form of a surrounding graphite ring. After the lower end 21 of the rod-shaped preform 2 has been thermally softened, a fiber 1 is drawn vertically downward from the softened end 21.

In order to control the atmosphere through which the fiber is drawn, the preform 2 and the furnace 3 are enclosed in a container 4. In the embodiment of the container illustrated in FIG. 1, the container 4 includes a gas inlet 41 and a gas outlet 42. In order to allow the fiber to be removed from the container 4, the floor of the container 4 includes an opening 53 through which the fiber 1 is drawn.

The container 4 provides a means for controlling the atmosphere through which the fiber 1 is drawn. To this end, a gas mixture of preferably, dry argon and a small amount of thionylchloride $SOCl_2$, that functions as a drying agent to react with ambient moisture, is fed through the gas inlet 41 into the container 4. This gas exits the container 4 through the gas outlet 42. Accordingly, during the drawing procedure, the preform 2 and fiber 1 are surrounded by a gas atmosphere that contains a drying agent that reacts with any moisture present therein.

By way of example, and not limitation, an example of the method for making the fiber 1 will not be set forth. A preform 2 of ZBLA glass etched in accordance with the method disclosed in German Published Application No. 35 14 082 was used. The preform has been initially pre-dried at 20° C. in an argon $SOCl_2$ gas atmosphere. The fiber was pre-dried at 80° C. in the apparatus of FIG. 1 after a FEP tube, which later served as a fiber sheath, had been slipped on. The fiber 1 was then subsequently drawn.

During the drying process, the argon to $SOCl_2$ ratio was set so that the resultant gas atmosphere in the container 4 contained approximately 100 parts per million $SOCl_2$. The furnace 3 was heated to a temperature of approximately 400° C. and the fiber 1 was then drawn through the atmosphere by a drawing drum (not shown).

Figure 2:
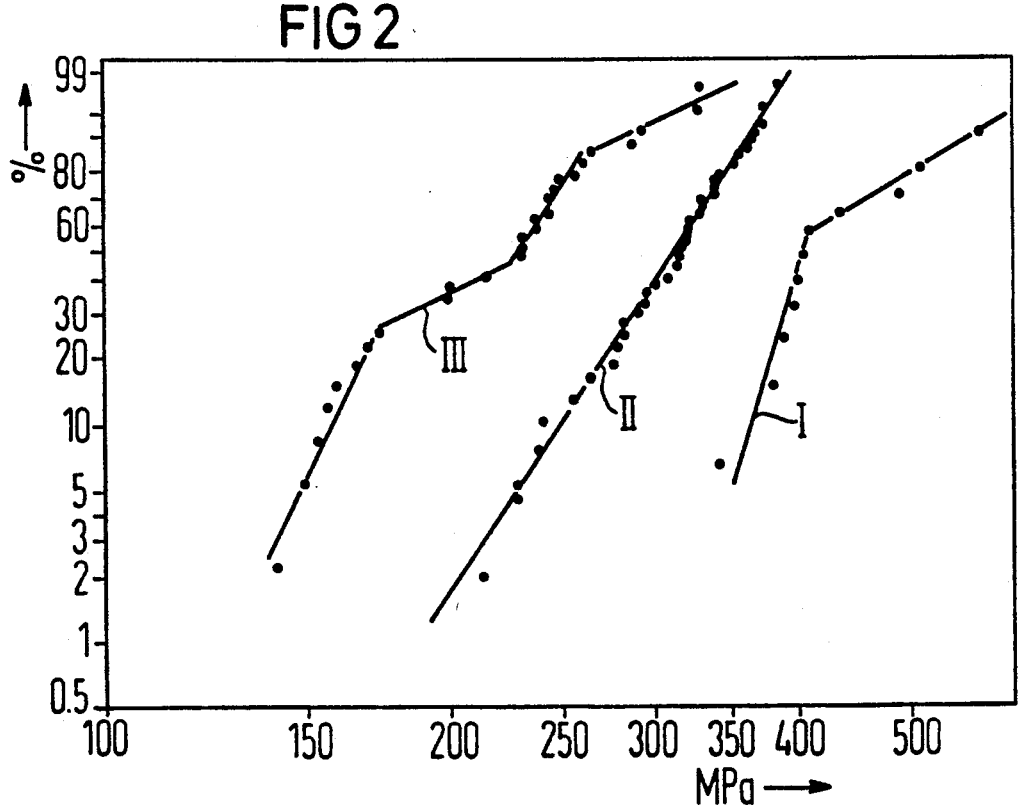
FIG. 2 illustrates a graphic representation of the tensile strength of a ZBLA fiber manufactured in accordance with the method of the present invention compared to two fibers manufactured by prior art methods.
Figure 3:
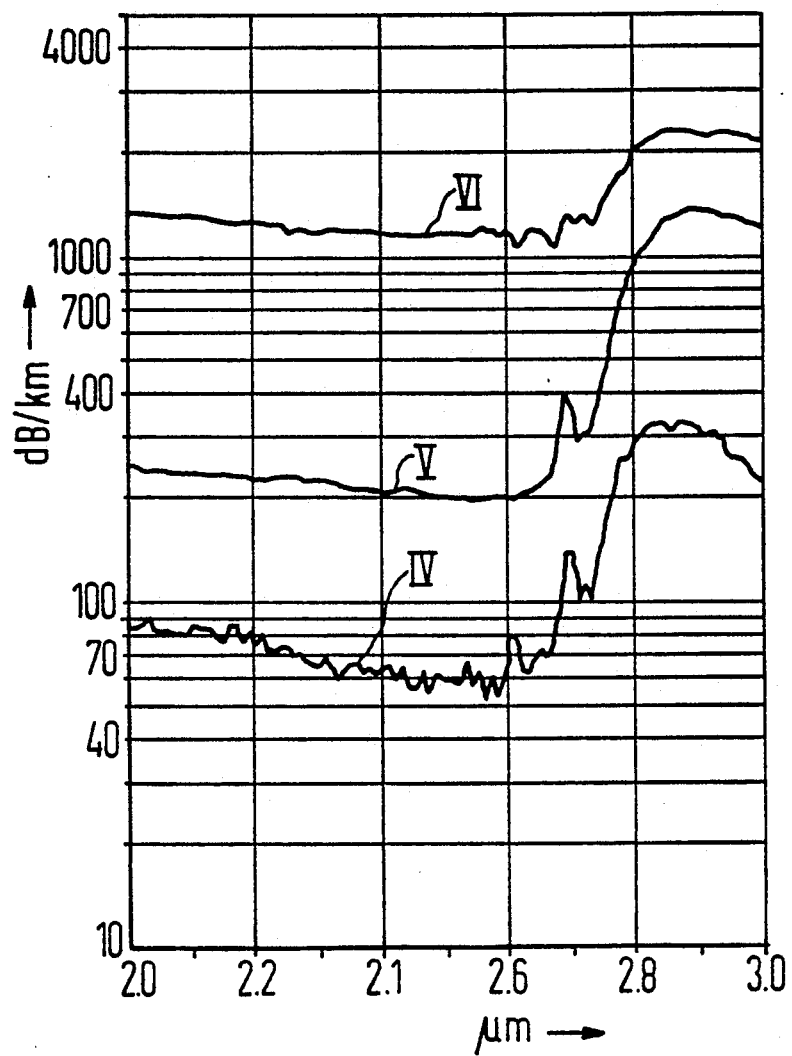
FIG. 3 illustrates a graphic representation of the attenuation of the various fibers of FIG. 2.

FIGS. 2 and 3 illustrate graphic representations of the tensile strength and attenuation of the fiber produced pursuant to the example set forth above and of fibers drawn from untreated ZBLA preforms without drying agents. Specifically, FIG. 2 illustrates a graphic representation of a comparison of the tensile strength of three fibers. Curve I represents the tensile strength of a ZBLA fiber manufactured as set forth above; curve II represents the tensile strength of a fiber drawn without a drying agent from a ZBLA preform etched in accordance with a known method; and curve III, represents the tensile strength of a fiber drawn from an untreated ZBLA preform and without a drying agent. As ILLUSTRATED, the fiber 1 drawn based on the method of the present invention (curve I), has a significantly improved tensile strength of, on the average, approximately 440 mpa.

Referring now to FIG. 3, a graphic illustration of the attenuation of various fibers based on wavelength is illustrated. A fiber drawn in accordance with the present invention is represented by IV, a fiber drawn without drying agent from a ZBLA preformed etch is represented by V, and a fiber drawn from an untreated ZBLA preform without drying agent is represented by VI. As illustrated, the fiber drawn in accordance with the method of the present invention has a noticeably lower attenuation of 60 dB/km when compared to the other two fibers.

It should be noted that, in this context, the smooth surface of the preform chemically polished, in accordance with the method of German Published Application No. 35 14 082, can deteriorate during the fiber drawing. In the case of glass $ZrO_2$ having a high melting point is presumably formed, this enabling a crystallization of a surface layer of the glass nucleator, this reduces the strength of the fiber and the light guidance in the fiber.

As set forth above, other drying agents can be used in addition to $SOCl_2$. Specifically, acid fluorides and acid chlorides can be utilized as the drying agent in the container 4. Likewise, as mentioned above, trifluoroacetic acid anhydride is especially useful as a drying agent because it has good adhesion with the FEP cladding. Likewise, as set forth above, drying agents that do not react with ambient moisture until the atmosphere is heated above room temperature can also be utilized for drying. These drying agents include: $BF_3$; $C_2F_6$; $C_3F_8$; hexafluoropropylene $C_3F_6$; octofluorocyclobutane $C_4F_8$; hexafluoroacetone $C_2F_6O$; $NF_3$; $ClF_3$; $BrF_3$; $JF_5$; $SF_4$; $SF_6$; chlorofluorocarbons; and freons.

Of course, the method of the present invention is not limited to ZBLA glass. The inventors of the present invention envision that the method of the present invention can be utilized with most halide glasses.

As previously stated, it may be desirable to remove the acid gasses that arise on the surface of the glass due to the reaction of the $SOCl_2$, or other drying agent, with ambient moisture. To this end, a second container 5, having a gas inlet 51 and a gas outlet 52, is provided. The fiber 1 is drawn from the container 4 into the container 5 through opening 53. The container 5 functions to contain a neutralizing gas atmosphere. Preferably, the neutralizing gas is $NH_3$. The $NH_3$ is fed into the container 5 through the gas inlet 51 and exits the container through gas outlet 52.

Accordingly, after being drawn through the dry gas atmosphere of container 4, the fiber 1 is then drawn through a neutralizing ga atmosphere in container 5. The fiber exits the second container 5 by being drawn through an opening 54 in the bottom floor of container 5. Both openings 53 and 54 are constructed so that although the fiber 1 can be drawn therethrough, the gas exchange between containers 4 and 5 and container 5 and the atmosphere, respectively, is at a minimum or prevented.

Figure 4:
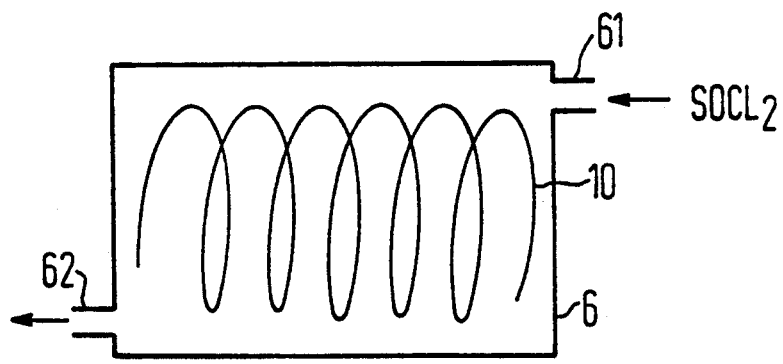
FIG. 4 illustrates a schematic perspective view of an apparatus of the present invention for reducing an OH band of an optical fiber.

FIG. 4 illustrates a schematic of an apparatus that can be utilized in an embodiment of the present invention. The apparatus illustrated in FIG. 4 is utilized for the subsequent drying of any water that may have been absorbed into the preform during the glass manufacturing process. This drying process will reduce the OH band down to 2.9 microns in the fiber.

As illustrated in FIG. 4, the fiber 10 is fed into a container 6 that has a gas inlet 61 and gas outlet 62. The gas inlet 61 functions to allow a gaseous drying agent to be fed into the container 6. A gaseous drying agent, such as, for example, $SOCl_2$ vapor, is introduced through the inlet 61 so that the fiber 10 is surrounded by the gaseous drying agent. The gaseous drying agent exits the container 6 through outlet 62. Accordingly, by flowing the drying agent through the inlet 61 and out the outlet 62, a continuous flow and circulation of a drying agent over the fiber 10 can be achieved.

If desired, the container 6 of FIG. 4 can be integrated into the apparatus of FIG. 1. Preferably, the container 6 would be located between containers 4 and 5. By utilizing the container of FIG. 4, the OH band present in the fiber 10 can be reduced on-line at the newly drawn fiber 1.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. A method of manufacturing infrared transmissive fibers of heavy metal fluoride glass comprising the steps of drawing a fiber from a glass mass while surrounding the mass and fiber in a gas atmosphere that includes a for reacting with the ambient moisture contained within the gas atmospher, the drying agent drying agent including at least one compound selected from the group consisting of: acid chlorides; acid fluorides, acid anhydrides; $BF_3$; $C_2F_6$; $C_3F_8$; hexafluoropropylene $C_3F_6$; octofluorocyclobutane $C_4F_8$; hexafluoroacetone $C_2F_6O$; $NF_3$; $ClF_3$; $BrF_3$; $JF_5$; $SF_4$; $SF_6$; chlorofluorocarbons; and freon, and then removing the fiber from said gas atmosphere and inserting the fiber into an acid neutralizing gas atmosphere.

2. The method of claim 1 wherein the glass mass is drawn at room temperature and the drying agent is chosen from the group consisting of acid chlorides, acid fluorides, and acid anhydrides.

3. The method of claim 1 wherein the glass mass is drawn through an atmospheric temperature greater than room temperature and the drying agent is chosen from the group consisting of: $BF_3$; $C_2F_6$; $C_3F_8$; hexafluoropropylene $C_3F_6$; octofluorocyclobutane $C_4F_8$; hexafluoroacetone $C_2F_6O$; $NF_3$; $ClF_3$; $BrF_3$; $JF_5$; $SF_4$; $SF_6$; chlorofluorocarbons; and freon.

4. The method of claim 1 wherein the acid neutralizing gas contains $NH_3$.

5. The method of claim 1 including the step of prior to drawing the glass mass into a fiber, the glass mass is pre-dried.

6. The method of claim 1 including the step of treating a resultant fiber with a gaseous drying agent for reducing an OH band of the glass fiber.

7. A method of manufacturing optical fibers from halide glass including the steps of providing a molten glass mass and drawing a fiber from the molten glass mass while surrounding the glass mass and a resultant fiber generated with a gas atmosphere containing an agent for reacting with ambient moisture after the atmosphere is heated to a temperature greater than room temperature, said agent including at least one compound selected from the group consisting of $CCl_2F_2$; $CClF_3$; and $C_2F_5Cl$ and then removing the fiber from said gas atmosphere and inserting the fiber into an acid neutralizing gas atmosphere.

* * * * *